United States Patent [19]

Koo et al.

[11] 3,774,168

[45] Nov. 20, 1973

[54] MEMORY WITH SELF-CLOCKING BEAM ACCESS

[75] Inventors: Tuh-Kai Koo; Kent R. McCune, both of Dayton, Ohio

[73] Assignee: The National Cash Register Company, Dayton, Ohio

[22] Filed: Aug. 3, 1970

[21] Appl. No.: 60,415

[52] U.S. Cl. ........... 340/173 CR, 250/201, 315/8.5, 315/12, 315/21 R, 328/124, 340/173 R

[51] Int. Cl. ..... G11c 5/04, G11c 7/00, G11c 11/30

[58] Field of Search .................. 340/173 CR, 173 R; 315/8.5, 21 R, 12; 328/124; 250/201

[56] References Cited

UNITED STATES PATENTS

| | | | |
|---|---|---|---|
| 3,633,268 | 1/1972 | Engbert | 29/574 |
| 3,609,711 | 9/1971 | Gunn | 340/173 R |
| 3,611,317 | 10/1971 | Bonfeld | 340/173 R |
| 3,624,633 | 11/1971 | Hofstein | 340/173 CR |
| 3,626,387 | 12/1971 | Terman | 340/173 R |
| 2,576,029 | 11/1951 | Mohr | 315/8.5 X |
| 3,588,584 | 6/1971 | Tubinis | 328/124 X |
| 3,528,064 | 9/1970 | Everhart | 340/173 CR |
| 3,483,414 | 12/1969 | Kazan | 313/65 AB |
| 3,444,526 | 5/1969 | Fletcher | 340/172.5 |
| 3,134,044 | 5/1964 | Auvil | 315/8.5 X |
| 3,550,094 | 12/1970 | Norton | 315/8.5 X |

*Primary Examiner*—Vincent P. Canney
*Assistant Examiner*—Stuart Hecker
*Attorney*—Albert L. Sessler, Jr. et al.

[57] ABSTRACT

There is described a beam accessed metal-oxide semiconductor memory into which binary information can be written and stored and from which that information can be read or erased. The writing, reading, or erasing is accomplished by causing an electron beam of either a high or a low intensity to scan across the gate or drain electrodes of the memory elements while simultaneously applying either a read, a write, or an erase voltage to the gate electrode thereof. There is also described means for controlling the beam position in a self-clocking manner. This is accomplished by providing metal indexing strips along the path which the beam travels and then counting the pulses created in the strips as the beam scans thereacross.

12 Claims, 14 Drawing Figures

INVENTORS
TUH-KAI KOO &
KENT R. McCUNE

BY Louis A Kline
John J. Callahan
Harry W Barron
THEIR ATTORNEYS

INVENTORS
TUH-KAI KOO &
KENT R. McCUNE
BY
THEIR ATTORNEYS

INVENTORS
TUH-KAI KOO &
KENT R. McCUNE

BY Louis A Kline
John J. Callahan
Harry W Barron
THEIR ATTORNEYS

INVENTORS
TUH-KAI KOO &
KENT R. McCUNE

Louis A. Kline
John J. Callahan
Harry W. Barron
THEIR ATTORNEYS

INVENTORS
TUH-KAI KOO &
KENT R. McCUNE

BY Louis A. Kline
John J. Callahan
Harry W. Barron
THEIR ATTORNEYS

INVENTORS
TUH-KAI KOO &
KENT R. McCUNE
BY Louis A. Kline
John J. Callahan
Harry W. Barron
THEIR ATTORNEYS

MEMORY WITH SELF-CLOCKING BEAM ACCESS

This invention relates to a memory and, more particularly, to a beam accessed memory for use in digital equipment requiring memory apparatus.

Existing beam accessed memory apparatus includes the well-known electrostatic storage tubes as typified by U.S. Pat. No. 2,951,176, issued Aug. 30, 1960, on the application of Frederic Calland Williams and entitled "Apparatus for Storing Trains of Pulses," and the many improvements thereon. That device has limited utility in that the time during which a binary digit (bit) may be stored is limited. Thus periodic regeneration is required. Further, the readout from that type of a device is destructive and thus undesirable.

Other types of beam accessed memories make use of semiconductor devices as the memory elements. Included in those types of devices is apparatus described in U.S. Pat. No. 3,401,294, issued Sept. 10, 1968, on the application of James R. Cricchi and Walter G. Reininger, and entitled "Storage Tube," and U.S. Pat. No. 2,547,386, issued Apr. 3, 1951, on the application of Frank Gray, and entitled "Current Storage Device Utilizing Semiconductors." The problem with those devices is that reading information cannot be accomplished with the electron beam, and thus a manual reading operation or complicated external circuitry is necessary. Another device using semiconductors in a beam accessed memory is described in U.S. Pat. No. 2,981,891, issued April 25, 1961, on the application of John W. Horton and entitled "Storage Device." That device requires a negative resistance diode and a rectifying diode to have a nondestructive readout by the electron beam. However, it is very difficult to construct negative resistance diodes on integrated circuits, so large-capacity beam access memories cannot be made using this principle.

For a truly large-capacity beam access memory (for example, one million bits or larger), it is necessary to use integrated circuits for the memory elements, and, for cost and space reasons, it is desirable to be able to use metal-oxide semiconductor (MOS) transistors as the memory elements. A beam access memory of that type is described in the Proceedings of the IEEE, Volume 56, No. 2, Feb., 1968, at pages 158 to 166, in an article entitled "An Electron Beam Activated Switch and Associated Memory," by N. C. MacDonald and T. E. Everhart. In that memory, complicated MOS device structure is necessary to facilitate beam readout. Thus packing density decreases, and cost increases.

Another problem with all of the above-mentioned prior-art devices is the manner of indexing the position of the beam. Where high packing density is necessary, the beam must be capable of being directed to very specific areas of the memory plane. Thus some sort of indexing scheme on the integrated circuit target is necessary. Further, if this indexing scheme can be used for clocking the logic circuitry necessary to operate the memory, a much simpler memory can be constructed, with resulting cost and space savings.

In accordance with one embodiment of this invention, there is provided a self-clocked beam access memory which has a plurality of memory elements arranged in blocks of elements. The memory is accessed by causing an energy beam to be affected along a given path which intersects each element in a given block. The memory comprises a plurality of conductors each of which intersects the path. Each one of a first portion of the conductors is positioned in proximity to and is associated with at least one individual memory element in the given block. Each one of a second portion of the conductors is in proximity to and is associated with at least one block of memory elements. There is a self-clocking signal created in a conductor whenever the beam crosses that conductor. The memory further includes logic means responsive to the application thereto of the self-clocking signal for causing the energy beam to be affected in a predetermined manner which is determined, at least in part, by the then-existing number of self-clocking signals which have been applied to the logic means.

The invention is hereafter described with reference to the following FIGURES, in which.

Figure 5:
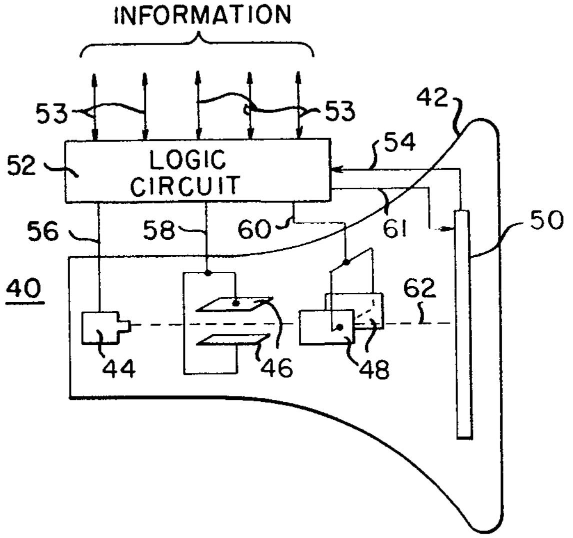
FIG. 5 shows generally the beam access memory.
Figure 9:
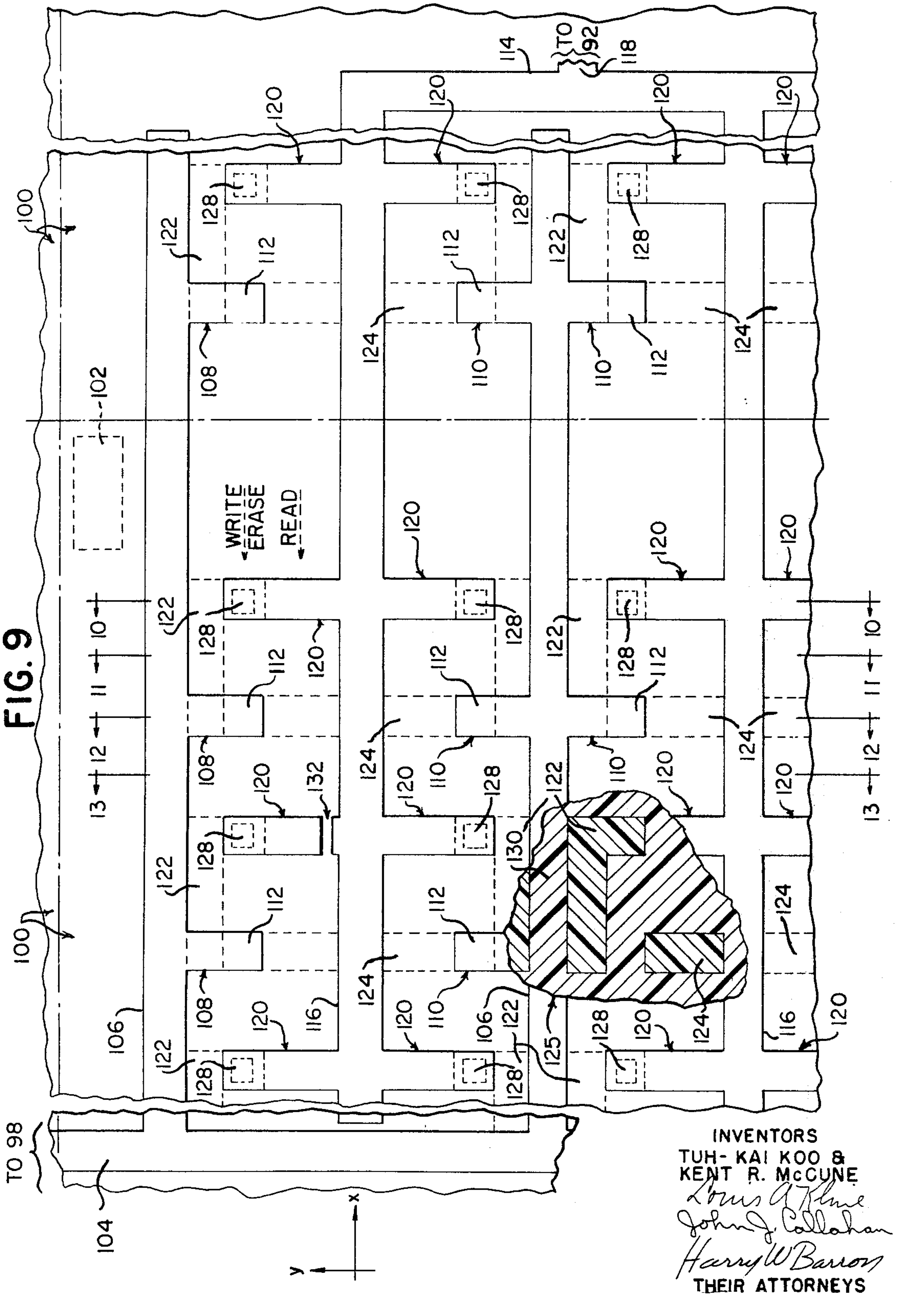
FIG. 9 is a diagram showing expanded portions of the section shown in FIG. 8.
Figure 14:
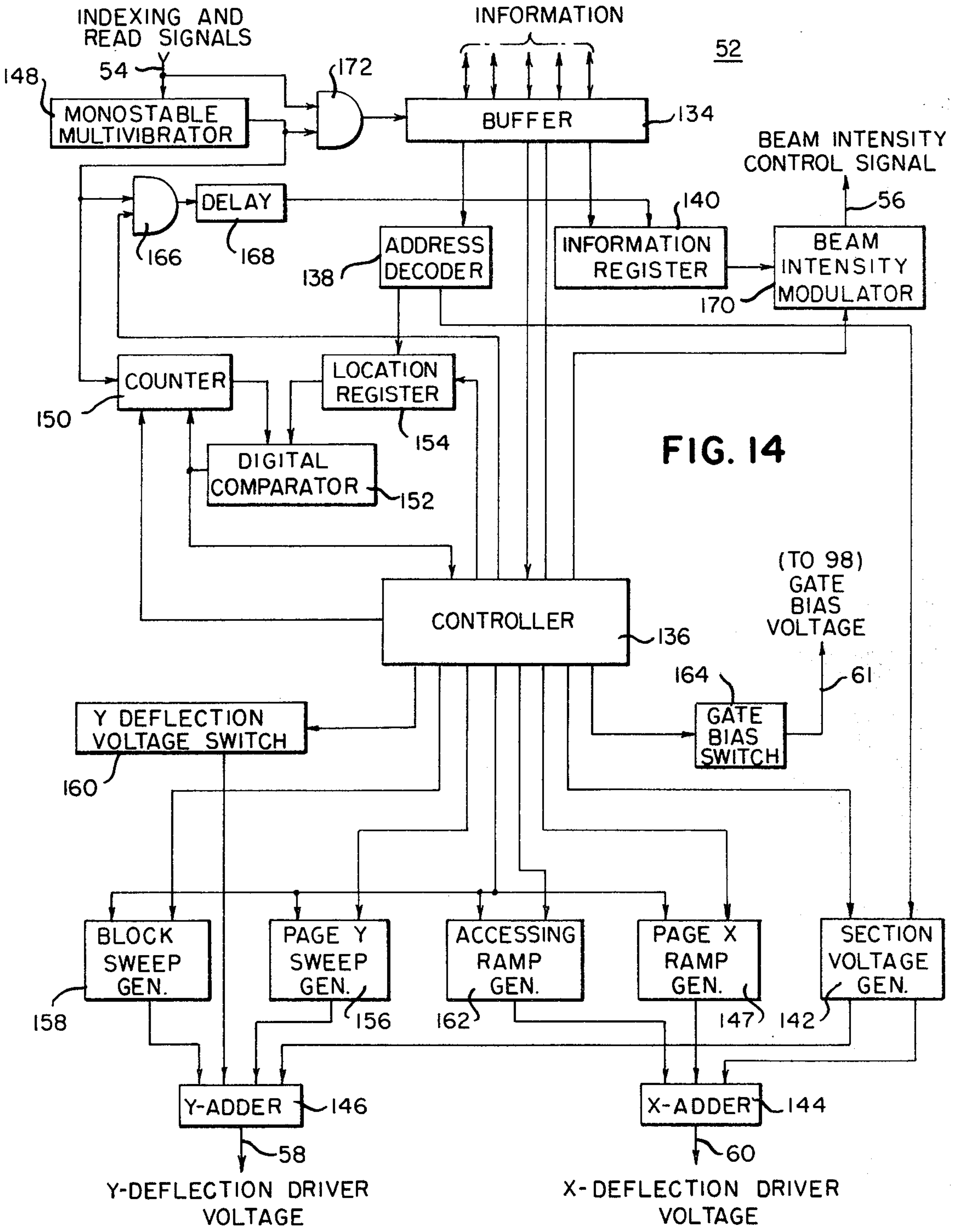

FIG. 10, 11, 12, and 13 show cross-sections taken along respective lines 10—10, 11—11, 12—12, and 13—13 in FIG. 9; and FIG. 14 is a block diagram showing the logic control circuitry for the memory shown in FIG. 5.

Before describing the memory itself, a description of the principles of operation of the memory will first be given. For this, reference is made to FIG. 1, which shows a P channel enhancement metal-oxide-semiconductor (MOS) transistor 10. The transistor 10 includes a substrate 12, of N doped silicon, which has two regions 14 and 16, of P doped silicon, diffused therein. Located above the substrate 12 and the regions 14 and 16 and connecting regions 14 and 16 is a layer of oxide material 18, which may be silicon dioxide. Placed on top of the oxide material 18 is a metal material 20, such as aluminum.

A pair of electrical connecting leads 22 and 24 are shown connected, respectively, to the metal material 20 and the region 16. A load resistor 26 is connected between the lead 24 and ground. The substrate 12 is also connected to ground. Hereinafter, the region 14 will be referred to as the drain 14, the region 16 as the source 16, and the material 20 as the gate 20.

The semiconductor 10 has a certain threshold voltage naturally associated therewith. This voltage may be in the order of approximately −3 to −4 volts. If a voltage having a magnitude greater than the threshold voltage of the semiconductor 10 is applied to the gate 20 through the lead 22, a relatively low resistance (in the order of 25 kilohms) conduction path, or a channel, will exist between the drain 14 and the source 16 through the substrate 12 in the region near the oxide material layer 18. However, if the voltage applied to the gate 20 through the lead 22 has a magnitude less than the threshold voltage of the semiconductor 10, the conduction path between the drain 14 and the source 16 will exhibit an extremely high resistance (in the order of 100 megohms) and for all practical purposes will be an open circuit.

The semiconductor 10 may be used as a memory element if one can vary the threshold voltage in such a manner that it could be controlled to be either above or below a given voltage which is to be applied to the gate 20. In this manner, whenever this given voltage is applied to the gate 20, either there will be a conduction path between the drain 14 and the source 16, or there will not be a conduction path between the drain 14 and the source 16. In the first case, the conduction path could be used to represent a logical 0 bit, and, in the latter case, the lack of a conduction path could be used to represent a logical 1 bit.

It has been found that, if one directs an electron beam towards the gate 20 of the semiconductor 10, while at the same time applying a certain voltage to the gate 20, the threshold voltage of the semiconductor 10 can be changed as a function of the beam intensity and the value of the gate voltage. For instance, where the semiconductor 10 is a P channel MOS device and a positive five volts is applied to the gate 20, the threshold voltage will change from about −3 volts to as much as −60 to −80 volts. Thus, one way in which a bit could be written into the semiconductor 10 would be to apply a certain voltage to the lead 22 and either apply an electron beam to the gate 20, if it is desired to change the threshold voltage, or not apply the electron beam to the gate 20, if it is desired to maintain the threshold voltage at its present value.

The threshold voltage shift of the MOS device 10, upon receiving electron bombardment, has been explained by induced positive charge accumulation, or trapping, at the substrate 12-oxide material layer 18 interface. Although the detailed mechanism of the trapping process is yet to be completely understood, a simplified model is set out below. This model offers satisfactory explanation to the experimental observation on the macroscopic scale.

Figure 1:
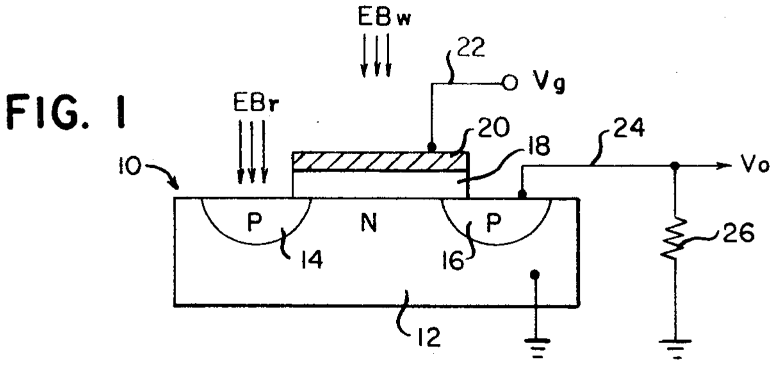
FIG. 1 shows a metal-oxide semiconductor.

Considering a MOS device 10 in FIG. 1, an electron beam $EB_{ir}$ is used to bombard the metal gate 20 as shown. If the electron beam energy is high enough to penetrate the metal gate 20 and the electrons continue to propagate inside the oxide material layer 18, electron-hole pairs are generated by collision process. Since the hole mobility inside the oxide material layer 18 is very small in comparison to the mobility of electrons, one may assume that all the holes are trapped immediately after generation, and electrons will be the only mobile charge carriers.

If there is no electric field inside the oxide material layer 18, space charge neutrality exists. Therefore, when the bombarding electron beam is turned off, the electron-hole pairs will recombine, and no space charge will be accumulated anywhere in the oxide material layer 18. However, if an electric field is created inside the oxide material layer 18, by, for instance, biasing the gate 20 positively with respect to the substrate 12, the free electrons will drift toward the metal gate 20 and will be neutralized upon entering the gate 20. On the other hand, the existence of an energy barrier at the substrate 12-oxide material layer 18 interface prevents the entry of electrons from the substrate. The trapped holes near the substrate 12-oxide layer 18 interface are, therefore, not neutralized and constitute positive charge accumulation. As the electrons continue to leave the oxide material layer 18, the positive charge accumulation continues to build up. The process continues until the biasing voltage drops entirely across the space charge region and a zero potential gradient is established within the rest of the oxide layer 18, so that electron flow stops. A good approximate treatment of the electron transport and space charge build up on a macroscopic scale can be obtained by applying the continuity equation inside the oxide layer 18 with zero boundary condition at the interface. When equilibrium is reached, and if the irradiation ceases before the biasing voltage is withdrawn, all the electrons will be recombined. The deficiency of electrons near the substrate 12-oxide material layer 18 interface results in the trapped holes not being neutralized, and a positive space charge layer results. Since no more mobile electrons are available and the oxide material layer 18 remains an insulator, no electron transport is possible, and the space charge remains trapped, or "stored," until another bombardment makes free electrons available to change the status.

The effect of the space charge at the interface can be treated with conventional MOS theory. If the structure is in the form of a field effect transistor, it increases the magnitude of the threshold voltage of the device. The magnitude of the threshold voltage can be returned to its initial value if the bombardment is repeated with a negative voltage applied to the gate 20.

A typical example would be a device having its threshold voltage changed from about −3 volts to about −60 volts; this would require a voltage of + 4 volts applied to the gate 20 and an irradiation at $2 \times 10^{-15}$ coul./$cm^2$ with a 5-kilivolt electron beam applied to the channel area. This could be accomplished by applying to an effective channel area of 0.15 mil by 0.15 mil a 5-microampere beam for 570 nanoseconds or a 2.9-microampere beam for one microsecond. Under these beam conditions, the new threshold voltage can be varied by merely varying the gate 20 voltage. It should be noted that this threshold voltage shift is reversible, reproducible, and very stable. It can be reversed by another bombardment with a negative gate voltage. In the reverse process, a shorter exposure time is required, since the stored positive charge adds the effect of the applied field.

Figure 2:
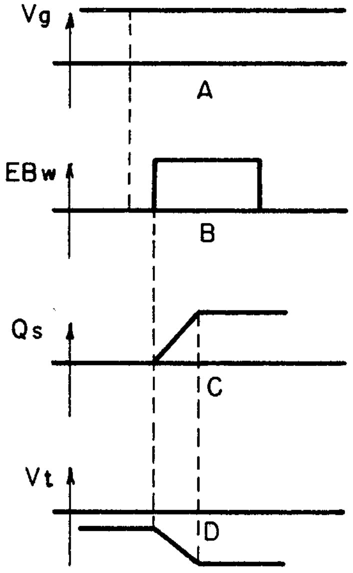
FIG. 2 shows a series of waveforms useful in understanding how a binary bit may be written into the semiconductor shown in FIG. 1.

FIG. 2 shows a series of waveforms which graphically illustrate how the threshold voltage may be changed. FIG. 2A shows a gate voltage of some arbitrary positive value which is applied through the lead 22 to the gate 20, and FIG. 2B shows the time during which the beam is on. With these two events occurring simultaneously, the negative charges in the oxide material layer 18 will tend to move towards the metal layer 20, thereby creating a positive charge build up along the interface of the substrate 12 and the oxide layer 18 until a certain maximum is reached. FIG. 2C shows graphically this charge $Q_s$ build up at the interface of the oxide material layer 18 and the substrate 12. The threshold voltage $V_t$ of the semiconductor 10, in turn, will go from the value of in the order of −3 volts to an increased magnitude in the order of between −20 and −80 volts, as seen in FIG. 2D. However, in practice, the threshold voltage $V_t$ will be limited to the puncture voltage of the oxide material layer 18. With this high-magnitude threshold voltage $V_t$, the semiconductor 10 has had written therein, and is now storing, a 1 bit.

If it is desired to erase the 1 bit stored in the semiconductor 10, a procedure which is substantially opposite to the above procedure is performed. More specifically, when one switches to erase a 1 bit from the semiconductor 10, the voltage applied to the gate 20 is made negative. This causes the charge build up between the interface of the oxide material layer 18 and the substrate 12 to be dissipated, and the threshold voltage will return to its normal value of approximately −3 volts.

Figure 3:
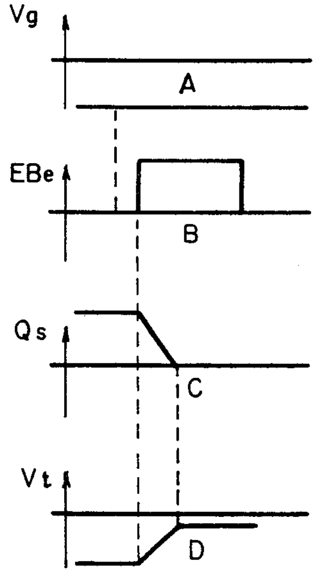
FIG. 3 shows a series of waveforms useful in understanding how the binary bit written into the semiconductor shown in FIG. 1 may be erased therefrom.

Referring to FIG. 3, a series of waveforms is shown which graphically illustrates the erase procedure. FIG. 3A shows the negative voltage applied to the gate 20, and FIG. 3B shows the electron beam being pulsed on at a given time. As seen from FIG. 3C, the charge $Q_s$ between the interface of the oxide material layer 18 and the substrate 12 decreases from its high value to a zero value, and from FIG. 3D it is seen that, as the charge $Q_s$ decreased, the magnitude of the threshold voltage $V_t$ also decreased, until it returns to the initial value of approximately −3 volts.

If a 0 bit had been written into the semiconductor 10 (that is, if the threshold voltage $V_t$ thereof had been allowed to remain at its initial value by the lack of a beam being applied to the gate 20 thereof), it would not be necessary to pulse the electron beam off when it is applied to the semiconductor. The application of the electron beam in conjunction with the application of the negative voltage to the gate 20 would have no effect on the threshold voltage $V_t$, because there would be no charge build up to be dissipated.

When one wishes to read the logical bit stored in the semiconductor 10, it is necessary to cause the electron beam to be shifted from the gate 20 of the semiconductor 10 to its drain 14 region. The electron beam will act as a current source connected to the drain 14. If the threshold voltage $V_t$ of the semiconductor 10 is lower than the read voltage which is applied to the gate 20, a conduction path having a relatively low channel resistance will exist between the drain 14 and the source 16. This will cause a current to flow through the resistor 26 and a voltage $V_o$ to exist thereacross. On the other hand, if the threshold voltage $V_t$ of the semiconductor 10 was higher than the voltage applied to the gate 20, the nearly infinite channel resistance between the drain 14 and the source 16 would result in a negligible current flow therebetween and consequently a negligible voltage drop across the resistor 26. Thus the substantial voltage drop across the resistor 26 due to the substantial current flowing therethrough indicates that a 0 bit had been written into the semiconductor 10 and was being stored thereby. Similarly, a negligible voltage drop across the resistor 26 due to a negligible current flowing therethrough indicates that a 1 bit had been written into the semiconductor 10 and was being stored thereby.

Figure 4:
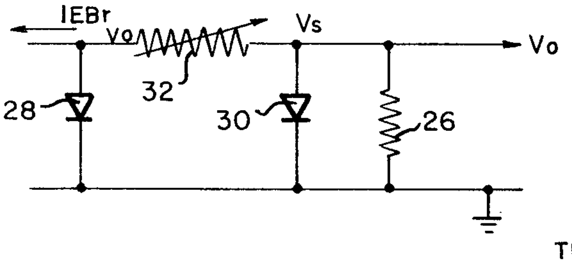
FIG. 4 is a circuit diagram useful in understanding how a bit written into the apparatus shown in FIG. 1 may be nondestructively read therefrom.

FIG. 4 shows a schematic diagram of the reading circuit described above. The two diodes 28 and 30, respectively, represent the rectifying junction between the drain 14 and the substrate 12 and between the source 16 and the substrate 12.

The anodes of the diodes 28 and 30 are connected together through a variable resistor 32, which represents the resistance of the channel of the semiconductor 10. The resistor 32 will have a relatively low value, which is in the order of 25 kilohms, if the threshold voltage of the semiconductor 10 is less than its gate voltage; similarly, the resistor 32 will have an extremely high resistance, which is in the order of 100 megohms, if the threshold voltage of the semiconductor 10 is greater than its gate voltage. As previously mentioned, the electron beam represents a current source and is shown as a current $I_{EB}$ which is flowing between ground and the junction of the anode of the diode 28 and the resistor 32. If one sets the value of the resistor 26 at one megohm and the value of the resistor 32 is at approximately 100 megohms, negligible current $I_{EB}$ will flow through the resistor 26, and a negligible voltage $V_o$ will appear thereacross. This will occur in spite of the fact that the current $I_{EB}$ is derived from a current source, because the diode 28 will undergo nondestructive breakdown, which prevents buildup of extremely high voltages. If, on the other hand, the value of the resistor 32 is approximately 25 kilohms, substantial current $I_{EB}$ will flow through the resistor 26, and a substantial voltage $V_o$ will appear thereacross. Thus, the voltage appearing across the resistor 26 is determined by the value of the resistor 32, which in turn is determined by the threshold voltage $V_t$. Since the value of the threshold voltage $V_t$ is determined by the value of the stored bit, the value of the voltage $V_o$ represents the value of the bit being read.

With the above in mind, reference is now made to FIG. 5, where a memory 40 using the invention herein is shown. The memory 40 includes a casing 42, in which a partial vacuum is created. The casing 42 seals within this partial vacuum an electron-beam-providing means 44, a pair of Y-deflection plates 46, and a pair of X-deflection plates 48. There is further included within the casing 42 a target 50, which includes a plurality of integrated circuit wafers. The target 50 will be explained in greater detail hereinafter.

The memory 40 further includes a logic circuit 52, which, in response to digital information applied on lines 53 and signals from the target 50 applied on a line 54, causes a beam intensity control signal to appear on a line 56, a Y-deflection drive voltage to appear on a line 58, an X-deflection drive voltage to appear on a line 60, and bias voltages to appear on a line 61. The beam intensity control signal appearing on the line 56 is applied to the electron-beam-providing means 44 and will control the intensity of its beam 62 in such a manner that the beam will be either on or off. When the beam 62 is on, it will be directed between the Y-deflection plates 46 and the X-deflection plates 48 in such a manner that it can be applied to any point on the target 50. The amount of Y and X deflection will depend upon the voltages appearing, respectively, on the lines 58 and 60.

The beam 62 arrives at a given point on the target 50 by being scanned in horizontal and vertical directions from a given point on the target 50. As it is being scanned, self-clocking indexing signals are generated on the line 54 and control the logic circuit 52. These signals on the line 54 are self-clocking signals, so that the memory 40 is a self-clocking system which does not require the presence of an internal clock or the many resulting connections necessary between the internal clock and various circuit elements in the memory 40.

Figure 6:
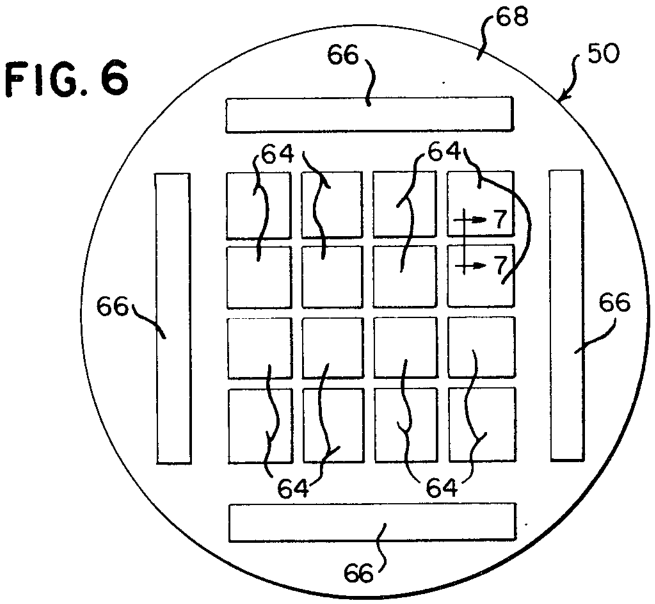
FIG. 6 shows the target shown in FIG. 5.

Referring now to FIG. 6, the side of the target 50 to which the electron beam 62 is applied is shown. The target 50 includes 16 integrated circuit wafers 64, which are arranged in a four-by-four matrix. Each of these integrated circuit wafers will hereinafter be referred to as a section, and a more complete description of a section will be given hereinafter. The target 50 further includes four control circuits 66, which are positioned along the four sides of the matrix of sections 64. The sections 64 and the control circuits 66 are placed on a substrate 68 and are held in a fixed position thereon. There is no interconnection between any of the sections 64. All electrical connections between a section 64 and one of the control circuits 66 are made on the opposite side (not shown) of the substrate 68.

Figure 7:
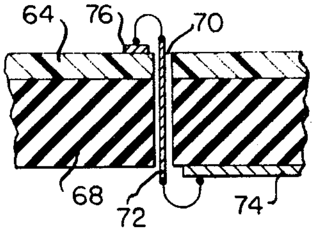
FIG. 7 is a cross-sectional view taken along the line 7—7 of FIG. 6, showing how the interconnection between various parts of the target may be made.

FIG. 7 is a cross-sectional view taken along the line 7—7 in FIG. 6 and shows how a connection is made from a given section 64 to the other side of the substrate 68. This is accomplished by having a hole 70 drilled through the substrate 68 and inserting an electrically-conducting member 72 through the hole 70. The member 72 is of such a length that it protrudes slightly above the top of the sections 64 and protrudes slightly below the bottom of the substrate 68. There is further included on the bottom of the substrate 68 a conductor 74, which may be plated wire or any other convenient means of providing an electrical conductor and which is coupled to one of the sections 64. Each of the sections 64 has five bonding pads 76, only one of which is shown in FIG. 7. A wire may be connected from the bonding pad 76 to the conductor 72. Similarly, on the other side of the substrate 68, a wire is connected from the conductor 72 to the conductor 74. In this manner, an electrical path will exist from the bonding pad 76 through the conductors 72 and 74 to the proper one of the control circuits 66. It should be noted that there will be a hole 70 and a conductor 72 for each of the bonding pads 76 on each of the substrates 68, and the connections between the substrates and the control circuits will be made in this manner. A variation of this would be plating the inside of the hole 70 with a conductor and bonding the wires to this plating.

Figure 8:
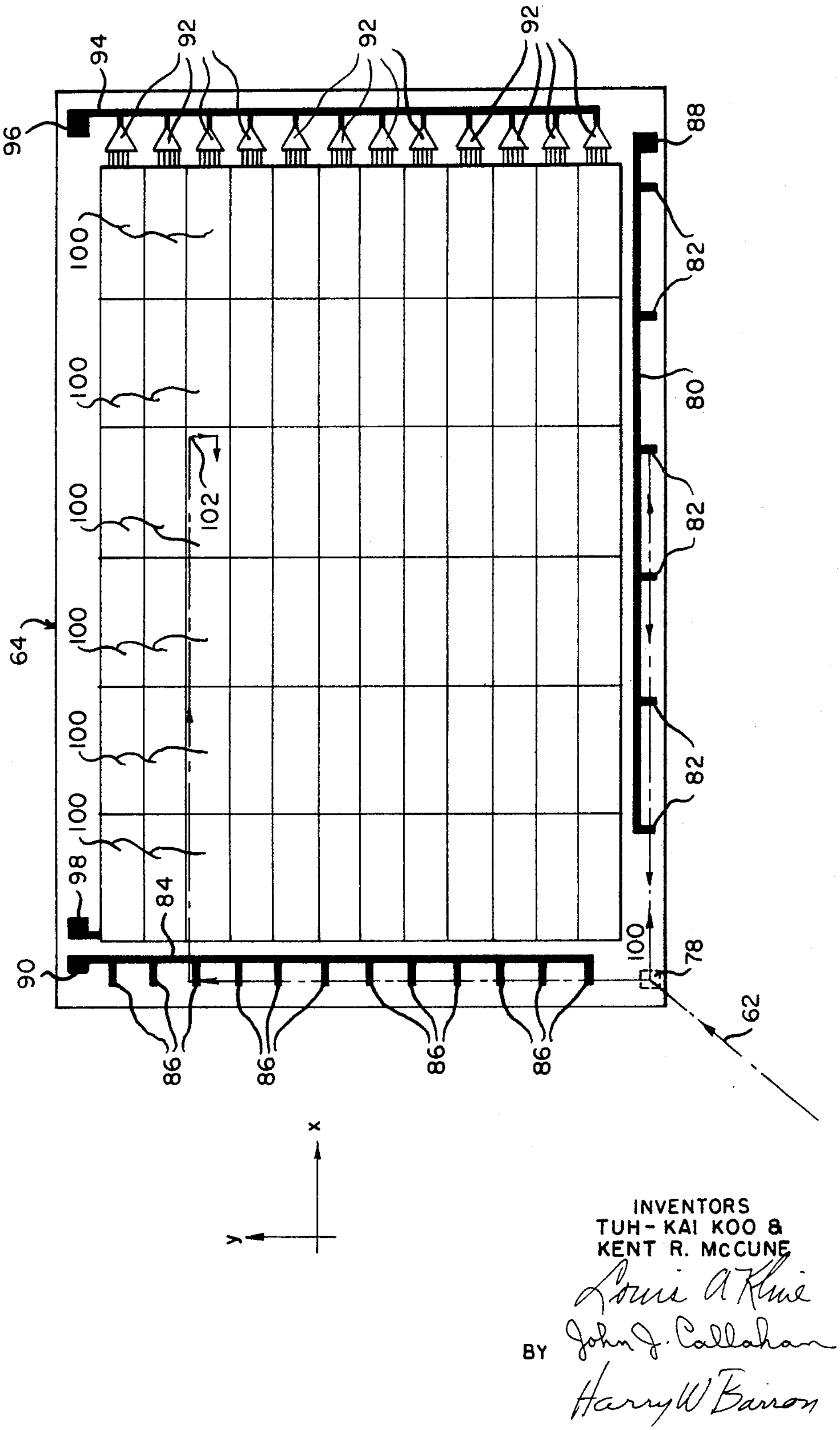
FIG. 8 is a view of one section of the target shown in FIG. 6.

Referring now to FIG. 8, there is shown one given section 64. The section 64 may be a piece of semiconductor substrate 930 mils by 948 mils on which memory elements and electron beam indexing strips are built. Of this area, 870 mils by 880 mils is used for memory elements, and 30 mils on each side of the section is used for beam location indexing strips, sensing pads, and sensing amplifiers.

An area 78 on the section 64 is designated as the Initial Target Area (ITA) and is positioned in one corner of the section 64. The deflection system of the memory 40 is accurate enough so that the electron beam 62 may be positioned in the ITA 78 without the necessity of using feedback techniques to position it precisely. Along the X-direction side of the section 64 taken from the ITA 78 corner, there is a strip 80 having a plurality of fingers 82 extending therefrom. The fingers 82 are of such a dimension that they extend across the entire Y dimension of the ITA 78. Along the Y-direction side of the section 64 taken from the ITA 78, there is a second conductor 84, which also has fingers 86 extending therefrom. The fingers 86 are of such a dimension that they extend entirely across the X dimension of the ITA 78. Each of the conductors 80 and 84 is connected to respective bonding pads 88 and 90. These bonding pads 88 and 90 are connected to the control circuits 66 in the manner previously described with respect to FIG. 7.

Along another side of the section 64 there is provided a plurality of amplifiers 92. Each of the amplifiers 92 has a plurality of inputs and a single output; each of the outputs is coupled to a conductor 94, which in turn is coupled to a bonding pad 96. The bonding pad 96 is connected to the control circuits 66 in the manner previously explained with respect to FIG. 7. There is also provided along the remaining side of the section 64 another bonding pad 98, which is used to couple the proper bias voltages to the memory elements which are built into the section 64.

The remaining portion of the section 64 is divided into a plurality of subdivisions, which hereinafter are referred to as pages and which will be described in detail hereinafter. In the section 64, there are 72 pages, which are arranged in a six-by-12 matrix. Each of the pages is 145 mils by 74 in dimensions. A strip which may be 3 mils wide at the top and 5 mils wide along the right side is provided for the page landing area.

The electron beam may be directed to any given page by the following procedures. First, the electron beam 62 is directed towards the ITA 78. Thereafter, it is scanned in the X direction so as to cross each of the fingers 82. As the electron beam crosses a finger 82, a self-clocking indexing signal is applied into the conductor 80 and arrives at the pad 88. Each of these signals is then applied to the control circuits 66 and thereafter to the logic circuit 52, where they are counted. It should be noted that each of the fingers 82 is positioned along the right side of an associated column of pages 100. Thus, if one wished to get the fourth page from the right, the electron beam would be scanned in the X direction across the fingers 82 until four signals have been applied to the conductor 80 and counted in the logic circuit 52. After the fourth signal has been sensed, the electron beam would cease scanning and would fly back to the ITA 78.

Thereafter, the electron beam 62 would be scanned in the Y direction across the fingers 86 in the manner previously described with respect to the fingers 82. After a sufficient number of signals have been received in the logic circuit 52 to indicate that the electron beam is at the proper Y position (that is, adjacent to the proper row of the matrix of pages 100), the beam 62 ceases scanning. Thereafter, the electron beam 62 flies to the X position, in which it was at the time it ceased scanning across the fingers 82. At this point, the electron beam will be at the page landing area 102, which is in the upper right-hand corner of the desired page.

The electron beam will thereafter be scanned in a negative Y direction until the proper position has been reached, and thereafter in a negative direction. At this point, the electron beam is being scanned across the desired elements. The manner in which the electron beam 62 is directed in the negative X and negative Y directions will be explained hereinafter in more detail.

In FIG. 9, a detailed drawing of selected portions of the section 64 is shown. More specifically, the extreme right-hand side and the extreme left-hand side of a section 64 are shown, as well as an area in the center of that section 64 at which a pair of pages are joined.

On the extreme left-hand side of the section 64, a bias pad 98 (not shown in FIG. 9) is connected to a vertical biasing strip 104, which runs in a vertical direction down the entire section.

The strip 104 has a plurality of horizontal biasing strips 106 connected thereto, each running horizontally across the section and separated by an equal distance of approximately 1 mil. The uppermost horizontal biasing strip 106 has a plurality of fingers 108 extending therefrom in the downward direction, and the remaining biasing strips 106 have fingers 110 extending therefrom in both the upward and downward directions. Each of the fingers 108 and 110 is separated from the fingers adjacent thereto by approximately 1 mil ahd has a length of approximately 1 half-mil. In all cases, the width of the metal strips 104, 106, 108, and 110 is approximately 0.2 mil. The thickness of each of the metal strips 104, 106, 108, and 110 is in the range of 1,000 to 20,000 angstroms, and they are constructed on top of a thick oxide layer having a thickness in the range of 5,000 to 20,000 angstroms, except over areas 112 of each of the fingers 108 and 110. The oxide layer under the areas 112 of each of the fingers 108 and 110 is a thin oxide layer in the range of 800 to 3,000 angstroms.

Referring to the extreme right-hand side of FIG. 9, there is shown a vertical indexing strip 114, which has a plurality of horizontal sensing strips 116 extending towards the left therefrom and a single strip 118 extending from the right therefrom. The strip 118 is connected to one of the inputs of one of the sensing amplifiers 92 shown in FIG. 8.

There may be any number of strips 116 extending from the indexing strip 114, and these strips are equispaced from one another by an amount of approximately 1 mil. Each of the strips 116 has a plurality of indexing finger strips 120 extending from both sides thereof. The fingers 120 are separated from one another by an equal distance of approximately 1 mil and have a length of approximately three fourths of a mil. Each of the strips 114, 116, 118, and 120 has a width of approximately 0.2 mil and a thickness in the range of 1,000 to 20,000 angstroms and is placed on a thick oxide layer. The fingers 108, 110, and 120 are so arranged with respect to one another that each finger 120 extends between each finger 108 or 110.

Beneath and connecting each of the biasing fingers 108 and 110 and the indexing fingers 120, there is constructed a region 122, of semiconductor material, which is doped opposite to the conductivity of the substrate 123. For instance, in the cross-hatched areas 125 of FIG. 9, there is seen an L-shaped region 122, of semiconductor material, which is under the first one fourth mil of the finger 108 or 110 (that is, the area not including the area 112 thereof) and under the final one fourth mil of the finger 120.

The region 122 is directly connected to the indexing finger 120 at the junction 128. The area 125 also includes a region 124, of semiconductor material, which is doped opposite to the conductivity of the substrate 123. The region 124 extends from the end of each finger 108 or 110 to the next indexing strip 116. The region 122 functions as the source of an MOS transistor, and the region 124 functions as the drain thereof. The area 112 of each of the fingers 108 or 110 is directly above the area between the regions 122 and 124 and is placed over a thin oxide layer; thus, the area 112 functions as the gate of the MOS transistor. Constructed in this manner, each of the MOS transistors is capable of being used as a memory element in the manner previously described with respect to FIGS. 1, 2, 3, and 4.

Each of the fingers 120 is connected to the source electrode at the junction 128; thus a direct connection is made between the source region 122 and the indexing finger strip 116. It should be noted that the oxide layer above the drain region 124 is also a thin oxide layer.

For a more complete understanding of structure shown in FIG. 9, reference is made to FIGS. 10, 11, 12, and 13, which, respectively, show a cross-section of FIG. 9 taken along respective lines 10—10, 11—11, 12—12, and 13—13. In FIGS. 10, 11, 12, and 13, like numerical designations are given to correspondingly like elements.

Figure 10:
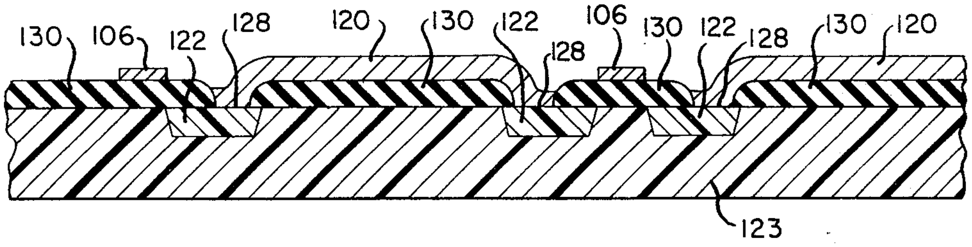

In FIG. 10, it is seen that the metal conductor 106 is a thin metal placed on top of a thick oxide layer 130. Also, the indexing strip 120 is a thick metal placed on top of a thick oxide layer 130. The junction 128 is formed by the junction of the metal indexing finger 120 and the source region 122.

Figure 11:
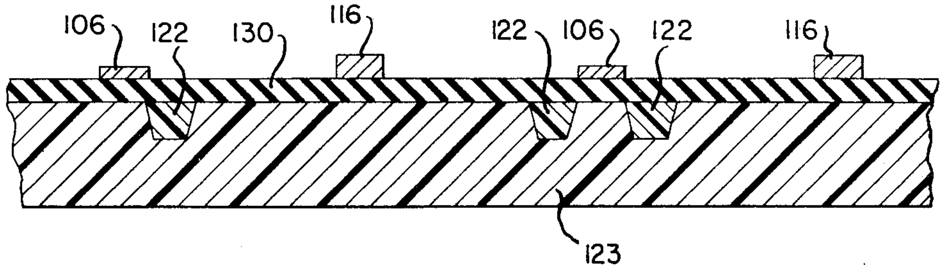
Figure 12:
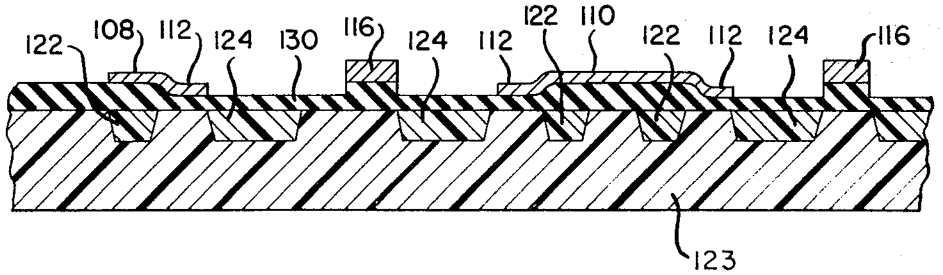
Figure 13:
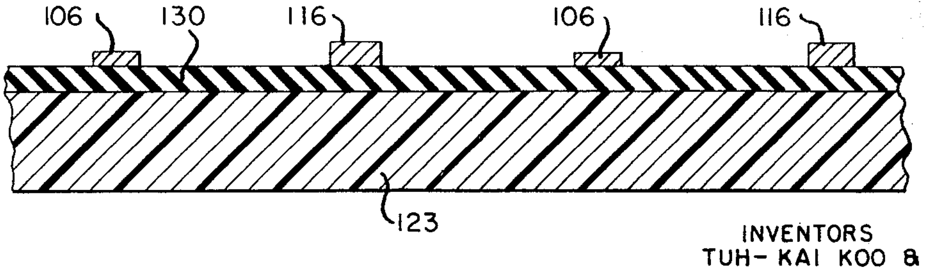

Referring to FIG. 11, it is seen that the metal strips 106 and 116 are all placed above a thick oxide layer. In FIG. 12, it is seen that the oxide layer 130 is thin over the regions of the gate and drain electrodes, and in FIG. 13 it is seen that the fingers 106 and 116 are placed over a thick oxide layer 130.

Thus, there are a plurality of memory elements each consisting of a source 122 region, a drain 124 region, and a gate 112 region, which are arranged in a row-by-column matrix. Between each pair of rows, there is an indexing strip 116, which has extending therefrom indexing fingers 120 that separate each element along that row. Further, between each pair of rows there is a biasing strip 106 having biasing fingers 108 and 110 connected to each element to provide a bias voltage to the gate electrode of each element in those rows.

Each row of a given page contains 135 memory elements, and a given row will hereinafter be designated as a block. There are 70 blocks in each page. Therefore each page is a 135 by 70 transistor matrix. Thus, in the memory 40, one can store 80,640 words of 128 bits each, or over 13.1 million bits, since in actual practice only 128 of the 135 elements in each block are used to store information. The remaining seven elements are provided in case certain of the elements in a block are defective or inoperative. By providing these extra elements, one can disconnect the inoperative elements by merely open-circuiting the connection between the indexing finger 120 and the indexing strip, as at the point 132 in FIG. 9. The significance of this will be explained hereinafter.

As previously explained, the electron beam can be positioned at the page landing area 102 by the use of the indexing fingers 82 and 86. However, in using the memory, it is desirable that a sequence of 128 logical bits be written in a given block. Once the beam is in the page landing area 102, it is scanned in a negative Y direction, or, in other words, down. Each time the beam crosses one of the indexing strips 116, a self-clocking indexing signal is applied through the conductors 114 and 118 to an amplifier 92 associated with that strip 116, and eventually to the logical circuit 52. These signals are in the form of pulses and are counted in the logic circuit 52. After a predetermined number of these pulses have been counted, the beam ceases scanning. As previously explained, when it is desired to write information into the memory or to erase information from the memory, the electron beam will have to be so adjusted that it is positioned at a point where it can be scanned across the gate electrodes of each of the devices in the given block. On the other hand, if it is desired to read information from the particular block, the beam will have to be so positioned that it is at a point where it can be scanned across the drain electrodes of each of the elements in the particular block.

Once the beam has been properly positioned, it is scanned in the negative X direction, or, in other words, to the left. Each time the beam crosses one of the indexing fingers 120, a self-clocking indexing signal is applied to the particular indexing strip 116 associated therewith. Each of these signals in turn is counted by circuits included in the logic circuit 52, and the particular count then existing determines the particular location of the beam.

If it is desired to write information into the memory, the electron beam is scanned across the gate electrodes of each of the elements. The beam is positioned at the gate electrode a fixed time after it has crossed the particular sensing strip 120 associated with that gate electrode (assuming constant scan speed. If it is desired to write a 1 bit into the memory, the beam is turned on just prior to this fixed time after the beam has crossed the sensing strip 120. If it is desired to write a 0 bit into the memory, the beam is turned off during this time. Similarly, when one is reading the information stored in a particular block, the beam is scanned across the drain electrodes of each element in the block. It should be recalled that, when the beam scans the drain electrodes of those elements storing 0 bits, a low-resistance current path exists between the drain and source electrodes, and, when it scans across the drain electrodes of those elements storing 1 bits, a high-resistance current path exists between the source and drain electrodes. In each case where a low-resistance current path exists, a current pulse is caused to appear on the indexing finger 120 as the electron beam is scanned across the drain region 124. This occurs a fixed time after a self-clocking pulse appears on the same indexing finger 120 resulting from the electron beam crossing that finger. Thus, means can be included in the logic circuit 52 which will detect between those signals provided when the beam crosses a sensing strip 120 and those signals provided when a current pulse appears on the sensing strip 120 due to the fact that the electron beam is then scanning the drain electrode. It should be noted that, when the electron beam does cross the drain electrode, the current between the drain and the source is applied to the sensing strip 120 due to the connection between the sensing strip 120 and the source 122 at the junction 128.

If, for one reason or another, one of the elements along a particular block is defective, it is possible, by merely disconnecting the indexing finger 120 from the indexing strip, to disconnect that element from the block. One of the seven extra elements provided in the block will then be used to store the information. A disconnection as just described is shown at the point 132 in FIG. 9. This disconnection should be made relatively close to the sensing strip 116, so that the electron beam, when reading from the block, will cross between the disconnection 132 and the connection 128. With the disconnection 132 positioned at this point, no signals will be applied to the sensing strip 116 either due to the read signal provided when the beam crosses the drain electrode or due to the self-clocking indexing signal when the beam is crossing the indexing finger 120. Because the system is self-clocking, this will result in no clocking pulse being applied to the control circuit 52, and therefore nothing will occur as the result of this defective element's being included in the system.

The advantage of providing the seven extra elements in each block and disconnecting defective elements from a block is that the yield of the section wafers is greatly increased. It can be shown mathematically that the expected yield will be increased from less than 1% to about 68% by using this technique. Further increases can be obtained by providing more extra elements, but a trade-off must be made between the cost of including the extra elements and the extra space required versus the higher yield.

Reference is now made to FIG. 14, where a block diagram of the logic circuit 52 is shown. The logic circuit 52 includes a buffer 134, which can receive or transmit binary information in parallel. The information which the buffer 134 receives will be divided into three categories. These are, first, command information; that is, information which tells the memory whether it is supposed to read, write, or erase. The second type of information which is applied to the buffer 134 is address information, which tells the memory 40 the section, the page, and the block in which information is to be written, read, or erased. The final type of information which the buffer 134 can receive is the digital information which is to be written into the memory 40. This third type of information is applied to the buffer 134 only in the event that it is desired to write information into the memory elements.

The command information which is applied to the buffer 134 is applied to a controller 136. The controller 136 includes a series of logic and driver circuits for causing various other circuits in the logic circuit 52 to be turned on or turned off at proper times. The controller 136 may be constructed by known logical design techniques and will herein only be described in detail by function.

The address information applied to the buffer 134 is applied to an address decoder 138. Since the information applied to the buffer 134 will come from a central processor of one sort or another, it is likely that this address information is not in terms of section, page, and block. Therefore, the address decoder 138 will convert the address information applied to the buffer 134 into information representing the particular section, the particular page, and the particular block which is then desired to be worked upon. This decoded information is applied to a section voltage generator 142 and to a location register 154. The information portion of the bits applied to the buffer 134 is applied to an information register 140 and stored therein until a later time. At this later time, the information in the information register 140 will be applied serially out of the information register 140.

The command signal which is applied from the buffer 134 to the controller 136 will tell the controller whether it is desired to write, to read, or to erase information from the memory elements. Assuming first that the command signal requires that information be written into the memory elements, the controller 136 first causes the section voltage generator 142 to apply an analog voltage, which represents the X coordinates of the ITA 78 of the proper section, to an X adder 144, and an analog voltage, which represents the Y coordinate of the ITA 87 of the proper section, to a Y adder 146. These voltages in turn are applied at the outputs of the adders 146 and 144, respectively, on the lines 48 and 60, and therefrom to the Y deflection plates 46 and the X deflection plates 48 within the casing 42 (see FIG. 5). This causes the electron beam to be positioned at the initial landing area 78 of the proper section in which the information is to be written.

The controller waits a certain time, which is determined by the maximum time required to position the electron beam at the ITA 78 from the farthest point on the target, and, thereafter, causes the page X ramp generator 147 to generate a ramp voltage. This ramp voltage is applied to the X adder 144 and added to the X voltage from the section voltage generator 142 to cause the electron beam 62 to scan in the X direction across the fingers 82, as seen in FIG. 8.

Each time a finger 82 is scanned by the beam 62, a voltage pulse appears on the line 54 and is applied to a monostable multivibrator 148. The trailing edge of this pulse triggers the multivibrator 148. The time constant of the multivibrator 148 is adjusted to be greater than the time necessary for the electron beam 62 to scan between one of the indexing fingers 120 and the gate 112 or drain 124 regions of the element associated with that indexing finger 120 and less than the time required for the electron beam 62 to scan between that one indexing finger 120 and the next adjacent one of the indexing fingers 120. In this manner, each time the beam crosses an indexing finger 120, a pulse is provided at the output of the multivibrator 148. Each of these pulses is applied to a counter 150, which counts the leading edge of each pulse applied thereto. The output of the counter 150 is applied to a digital comparator 152.

At the time the controller 136 started the page X ramp generator 147, it also caused the X coordinate of the page portion of the address stored in the location register 154 to be provided to the digital comparator 152. Whenever the count in the counter 150 reaches the value of the page X coordinate stored in the location register 154, a signal is provided by the digital comparator 152. This signal is applied to the counter 150 to reset it to a count of zero, and also to the controller 136 to tell it that the proper X position of the page has been reached.

The controller 136, after receiving the signal from the digital comparator 152, locks the page X ramp generator 147 voltage to its value and ceases applying it to the adder 144. At this time, the electron beam will fly back to ITA 78. Thereafter, the controller 136 causes the page Y coordinate to be applied to the digital comparator 152 and causes the page Y sweep generator 156 to begin generating a ramp voltage. This causes the electron beam 62 to scan in the Y direction across the fingers 86, and, each time a finger 86 is scanned by the electron beam 62, a signal is applied through the pad 90 and eventually to the line 54. Each of these signals triggers the monostable multivibrator 148, as previously explained, and the output thereof is applied to the counter 150 to cause the count therein to increase. When the count in the counter 150 reaches the page Y coordinate value, the digital comparator 152 again provides the signal resetting the counter to zero and informing the controller 136 of this fact. At this time, the controller 136 releases the page X ramp generator 147 voltage and again applies it to the X adder 144. As a result of this action, the electron beam flies to the proper page landing area 102. The controller 136 maintains the voltages provided by the page X sweep generator 147 and the page Y sweep generator 156 at these values. It should be noted that the fly speed of the electron beam 62 is in the order of 335 mils per microsecond, whereas the scan speed of the electron beam 62 is in the order of 1 mil per microsecond.

At this time, the electron beam 62 is being directed to the page landing area 102 in the upper right corner of the proper page 100. It is now necessary to position the electron beam adjacent to the gate electrodes of the proper block in which the information is to be written. This may be accomplished by causing the controller 136 to enable a block sweep generator 158, which provides a ramp voltage to cause the electron beam 62 to be scanned in the negative Y, or downward, direction. At this time, the controller 136 also causes the block address to be applied to the digital comparator 152. As the electron beam scans down the particular page 100, it crosses each of the indexing strips 116, thereby causing a pulse to be applied to the line 54 and trigger the monostable multivibrator 148. These pulses are applied, in the manner previously described, to the counter 150, which increases its count by 1 for each pulse. When the counter 150 arrives at a count equal to the block count stored in the location register 154, the digital comparator 152 again provides a signal which resets the counter 150 to zero and informs the controller 136 that the electron beam 62 is positioned adjacent to the indexing strip 116 which is associated with the proper block. In response to this signal, the controller 136 locks the voltage provided by the block sweep generator 158.

At this time, the controller 136 applies a signal to a Y deflection voltage switch 160, which in turn provides the proper positive or negative voltage to the Y adder 146 to cause the electron beam 62 to move from the indexing strip 116 to a point adjacent to the gate electrode of the proper block in which the information is to be written.

At this time, the controller 136 enables an accessing ramp generator 162 and causes a gate bias switch 164 to provide the proper read bias voltage to the line 61 and the pad 98. The accessing ramp generator 162 causes the electron beam 62 to be scanned in the negative X direction, or to the left, across the gate electrode of each element in the proper block. Each time the electron beam 62 crosses one of the indexing fingers 120, a pulse is generated and eventually applied to the line 54 to trigger the monostable multivibrator 148.

At the same time the controller 136 enabled the accessing ramp generator 162 and the gate bias switch 164, it applied a signal to enable an AND-gate 166. In this case, each of the pulses from the monostable multivibrator 148 is applied through the AND-gate 166 and a delay circuit 168 to the information register 140. On the occurrence of each of the pulses applied to the information register 140, a signal corresponding to the particular bit to be written in the next memory element appears at the serial output of the information register 140 and is applied to a beam intensity modulator 170. The amount of delay provided in the delay circuit 168 is determined by the time required for the electron beam to be scanned from an indexing finger 120 to the gate electrode of the memory element which that particular indexing finger 120 is associated with. Thus, a signal is provided from the information register 140 to the beam intensity modulator 170 just prior to the time the electron beam 62 scans the gate electrode or the memory element.

If the bit provided by the information register 140 is a logical 1 bit, the beam intensity modulator 170 applies a signal to the line 56, which causes the electron beam of a given intensity to be applied. On the other hand, if the bit provided by the information register 140 is a logical 0 bit, no signal is applied to the line 56 by the beam intensity modulator 170, and a beam of a low or zero intensity is scanned across the gate electrode of the particular element. This procedure continues for each of the 128 memory elements which are to be used in a given block.

After the count in the counter 150 has reached a value of 128, a signal is sent from the digital comparator 152 to the controller 136, informing it that the entire block has been scanned by the electron beam. In response to this signal, the controller 136 disables all circuits which are still enabled and informs the buffer 134 that it can accept new information to be processed by the memory.

If one had wished to erase information from a particular block in the memory, the procedure would be similar, with the following three exceptions. First, the information applied to the buffer 134 would include only command and address information. Second, the beam intensity modulator 170 would not be capable of turning the electron beam 62 off, or, in other words, a signal would always be appearing on the line 56. Third, the gate bias switch 164 would be caused to provide a negative voltage as opposed to the positive voltage which it had been providing during the read portion of the cycle. In other words, the erase aspect of this operation is similar to writing a 1 bit but with a negative gate bias applied to each of the memory elements in the particular block.

When it is desired to read information which is stored in the memory, the signal applied to the buffer 134 will include a command signal, indicating that a read operation is to be performed, and an address signal, indicating which block of information is to be read. The manner in which the electron beam is applied to the particular block is identical to how it was done previously, with the exception that the voltage provided by the Y deflection voltage switch 160 is slightly different from the voltage previously applied. This is due to the fact that, during the read operation, it is necessary to scan the electron beam 62 across the drain electrodes of each of the memory elements as opposed to across the gate electrodes thereof.

While reading information from the particular block, it should be noted that, as the electron beam 62 is scanned across the block, a self-clocking indexing pulse will occur due to the electron beam 62 being scanned across the indexing fingers 120. Between certain ones of these self-clocking indexing pulses, there will also be read pulses which occur when the electron beam is scanned across those elements which have 0 bis stored therein. In the case of those memory elements having 1 bits stored therein, there will be no read type pulses.

Each of the self-clocking indexing and the read pulses provided when reading from a particular block is applied to the line 54 and the monostable multivibrator 148. These signals are also applied to one input of an AND-gate 172. The other input of the AND-gate 172 is coupled to the output of the monostable multivibrator 148. Since the duration of the multivibrator pulse is just less than the time required for the beam to be scanned from one indexing finger 120 to the next adjacent indexing finger 120, and since the trailing edge of the self-clocking indexing pulses triggers the monostable multivibrator 148, only the read pulses appearing on the line 54 will be applied through the AND-gate 172 and into a serial input of the buffer 134. In other words, the AND-gate 172 is enabled by the self-clocking indexing pulses to pass the read pulses. Each time a read pulse is applied to the buffer 134, it will indicate that a zero bit has been read, and each time no read pulse is applied thereto, it will indicate that a 1 bit has been read.

The signals from the multivibrator 148 are also applied to the counter 150, which counts to a value of 128; when the count in the counter 150 reaches 128, the digital comparator 152 applies a signal to the controller 136, informing it that the entire block has been read. At this time, the controller 136 again disables all circuits which are still enabled and informs the buffer 134 that the information has been read and causes the buffer 134 to transmit the information to the proper place. At this time, the buffer 134 can accept a new signal and either read, write, or erase information as necessary.

What is claimed is:

1. A method for directing an energy beam to a specific given point on a target which has thereon a plurality of addressable blocks each including a plurality of memory elements, said given point being in a given block which has at least one coordinate address, said method comprising the steps of:

providing at least one block-determining conductor connected to a common point for each predetermined number of blocks;

scanning said energy beam across a first path which intersects said block-determining conductors, there being a signal created in each of said block-determining conductors when said energy beam is scanned thereacross;

counting the signals applied to said common point from said block-determining conductors;

halting said scanning after a certain number of said signals are counted, said certain number being related to said one address of said block;

providing a plurality of individual conductors each of which is coupled to said common point, each of said individual conductors being in the proximity of and associated with one of said elements in said given block;

scanning said energy beam across a second path in said block which intersects each element and each associated individual conductor in each block, there being a signal created in each of said individual conductors when said energy beam is scanned thereacross, said second path being a continuation of said first path; and counting the signals applied from each of said individual conductors to said common point.

2. The method according to claim 1 further including the step of adjusting the position of said energy beam after said energy beam has been halted to position said energy beam adjacent to said given block.

3. The method according to claim 2 further including the steps of: determining which of said elements is inoperative; and disconnecting the individual conductor associated with each inoperative element from said comon point.

4. A method for directing an energy beam to a given point on a target which has thereon a plurality of elements arranged in a plurality of block configurations, each block being in a unique area of said target, said given point being in a given block which is in a given area, said given area having a first and a second coordinate address, said given block having a third coordinate address, said method comprising the steps of:

providing a first main conductor along a first portion of said target, said first main conductor having a plurality of first finger conductors extending therefrom, each of said first finger conductors representing a different first coordinate address;

providing a second main conductor along a second portion of said target, said second main conductor having a plurality of second finger conductors extending therefrom, each of said second finger conductors representing a different second coordinate address;

scanning said energy beam across said first finger conductors, there being a signal created in each first finger conductor as said energy beam is scanned thereacross, each of said signals being applied to said first main conductor;

counting said signals applied to said first main conductor;

noting the position of said energy beam after counting a first certain number of said first main conductor signals, said first certain number being related to said first coordinate address;

scanning said energy beam across said second finger conductors, there being a signal created in each second finger conductor as said energy beam is scanned thereacross, each of said signals in said second finger conductors being applied to said second main conductor;

counting said signals applied to said second main conductor;

noting the position of said energy beam after counting a second certain number of said second main conductor signals, said second certain number being related to said second coordinate address;

causing said energy beam to go to a point on said target which has the coordinates of said two noted positions of said energy beam;

providing at least one third main conductor for a selected number of blocks, each of said third main condcutors being related to said third coordinate address;

scanning said energy beam from the point having said two noted positions across said third main conductors, there being a signal created in each of said third main conductors as said energy beam is scanned thereacross;

counting the signals created in each of said third main conductors;

halting said scanning after a third ceratin number of said third main conductor signals have been counted as a result of said energy beam scanning across a given thrid main conductor, said third certain number being related to said third coordinate address;

providing a plurality of third finger conductors each connected to one of said third main conductors, each of said third finger conductors being in the proximity of and associated with one of said elements;

scanning said energy beam along a path which intersects the third finger conductors associated with the elements in said given block, there being a third finger conductor signal created in each of said third finger conductors which are scanned by said energy beam; and counting said third finger conductor signals.

5. The method according to claim 4 further including the step of adjusting the position of said energy beam after said scanning has been halted as a result of said energy beam scanning across said given third main conductor to position said energy beam adjacent to said given block.

6. The method according to claim 5 wherein said energy beam is an electron beam.

7. A self-clock beam accessed memory which has a plurality of memory elements arranged in blocks of elements, said memory being accessed by causing an energy beam to be affected along a given path, said given path intersecting each element in a given block, said memory comprising:

a plurality of conductors each of which intersects said given path, each one of a first portion of said conductors being positioned in proximity with and being connected with each individual memory element in said given block and each one of a second portion of said conductors being in proximity with and being associated with at least one block of memory elements, there being a self-clocking signal created in a conductor whenever said energy beam crosses that conductor and wherein digital information may be read from said memory by causing said given path to intersect a certain portion of each element to cause a read signal representative of the information stored in that element to be applied to the individual conductor associated with that element; and logic means responsive to the application thereto of said self-clocking signals for causing said energy beam to be affected in a predetermined manner, said predetermined manner being determined at least in part by the then existing number of self-clocking signals which have been applied to said logic means, said read signals being detected by said logic means after certain ones of said self-clocking signals are applied to said logic means.

8. The invention according to claim 7:

wherein each of said elements is an insulated-gate field-effect semiconductor device having two main electrodes and a control electrode, said individual conductors of said first portion being connected to one of said main electrodes and said path intersecting the other one of said main electrodes in the event information is to be read from said memory; and wherein a read voltage is applied to the control electrode of each device at the time said energy beam is being directed towards the other main electrode thereof.

9. The invention according to claim 7:

wherein each of said elements is an insulated-gate field-effect semiconductor device having two main electrodes and a control electrode, said path intersecting said control electrodes in the event information is to be written into said memory;

wherein said digital information includes bits having first and second values;

wherein said energy beam has a first intensity when a bit of said first value is to be written and has a second intensity when a bit of said second value is to be written, said beam intensity changing at a time determined by the application to said logic means of a self-clocking signal; and wherein a write voltage is applied to the control electrode of each device at the time said beam is being directed towards that device.

10. In a system which includes means for providing an electron beam, at least one integrated circuit target having at least one page, each page having a plurality of insulated-gate field-effect transistor memory elements which are arranged in a configuration which includes a plurality of addressable blocks over a portion of said integrated circuit, and electron beam direction determining and scanning means for scanning said electron beam along a given path, apparatus for controlling the position of said electron beam comprising:

a main electrical conductor for each of said blocks, said main conductors extending beyond the portion of said page that includes said elements so that at least some of said main electrical conductors intersect one portion of said given path;

a plurality of individual electrical conductors associated with and connected to each main electrical conductor, each of said individual electrical conductors being positioned in proximity with and connected to an associated element, at least some of said individual electrical conductors which are associated with elements that are in a given block intersecting another portion of said path; there being an indexing signal resulting each time said electron beam crosses a main electrical conductor or an individual electrical conductor; and logic means, electrically coupled to said main electrical conductors, for counting said indexing signals which result whenever said beam is directed across a main electrical conductor or an individual electrical conductor while being scanned along said given path, and for controlling said beam direction determining and scanning means in response to the number of indexing signals counted, such that said electron beam direction determining and scanning means causes said electron beam to be scanned over said one portion of the page until said logic means counts sufficient indexing signals to indicate that said beam has reached the main electrical conductor associated with the block having said given element therein;

wherein said electron beam direction determining and scanning means includes means for adjusting the position of said electron beam so that said electron beam can be scanned along another portion of said given path; and wherein said electron beam direction determining and scanning means causes said electron beam to be scanned along said another portion of said given path until said logic means counts sufficient indexing signals to indicate that said electron beam has reached a certain element in said block.

11. The invention according to claim 10 in which said integrated circuit target includes a plurality of said addressable pages arranged in a rows-by-columns configuration;

wherein said apparatus for controlling the beam position further includes first and second electrical conductors which have fingers extending therefrom, said first electrical conductor being positioned substantially parallel to said columns and having at least one finger for a predetermined number of said rows, said second electrical conductor being positioned substantially parallel to said rows and having at least one finger for a predetermined number of said columns, there being an indexing signal applied to said logic means each time a finger is scanned by said electron beam;

wherein each page of said integrated circuit has an address corresponding to a first number of first conductor fingers and a second number of second conductor fingers; and wherein a given page may be accessed in response to signals from said logic means by causing said electron beam to scan across the fingers of one of said first and second electrical conductors until the finger corresponding to said one conductor address of said given page is reached, by thereafter causing said electron beam to scan across the fingers at the other of said first and second electrical conductors until the finger corresponding to the other conductor address of said given page is reached.

12. The invention according to claim 10 wherein said logic means includes:

means for providing an address signal indicative of a value corresponding to the address of said given block;

a counter, responsive to the application thereto of said indexing signals, for providing a signal indicative of a value equal to the number of indexing signals applied thereto;

a comparator responsive to said counter signal and said address signal for providing a signal whenever said counter signal and said address signal both indicate the same value; and means responsive to said comparator signal, for providing signals which are applied to said electron beam direction determining and scanning means to cause the position and the direction of said electron beam to be affected in such a manner that said electron beam is scanned along said given path.

* * * * *